United States Patent [19]

Gerry

[11] 4,020,503
[45] Apr. 26, 1977

[54] STILL IMAGE SLIDE WITH SOUND TRACK CONTROL

[76] Inventor: Martin E. Gerry, 13452 Winthrope St., Santa Ana, Calif. 92705

[22] Filed: Mar. 26, 1976

[21] Appl. No.: 671,016

[52] U.S. Cl. .................................. 360/1; 352/37; 353/19

[51] Int. Cl.² ...................................... G11B 23/44

[58] Field of Search ............. 353/19; 352/1, 5, 26, 352/37; 360/1, 2, 82, 85, 86

[56] References Cited
UNITED STATES PATENTS

| | | | |
|---|---|---|---|
| 3,176,580 | 4/1965 | Metz | 353/19 |
| 3,671,115 | 6/1972 | Larkin | 360/1 |
| 3,685,893 | 8/1972 | Castedello | 353/19 |
| 3,846,839 | 11/1974 | Gerry | 360/2 |
| 3,891,830 | 6/1975 | Goldman | 360/2 |

*Primary Examiner*—Jay P. Lucas

[57] ABSTRACT

Means for providing stationary images from slides and sound related to these images include a retainer for insertion of a slide, an endless taut magnetic tape mounted within the retainer, and stationary magnetic heads that impose sound tracks on the tape and reproduce such sound tracks. Control circuitry connected to the heads provide a group of sound tracks for each image of a slide in predetermined sequential order.

11 Claims, 7 Drawing Figures

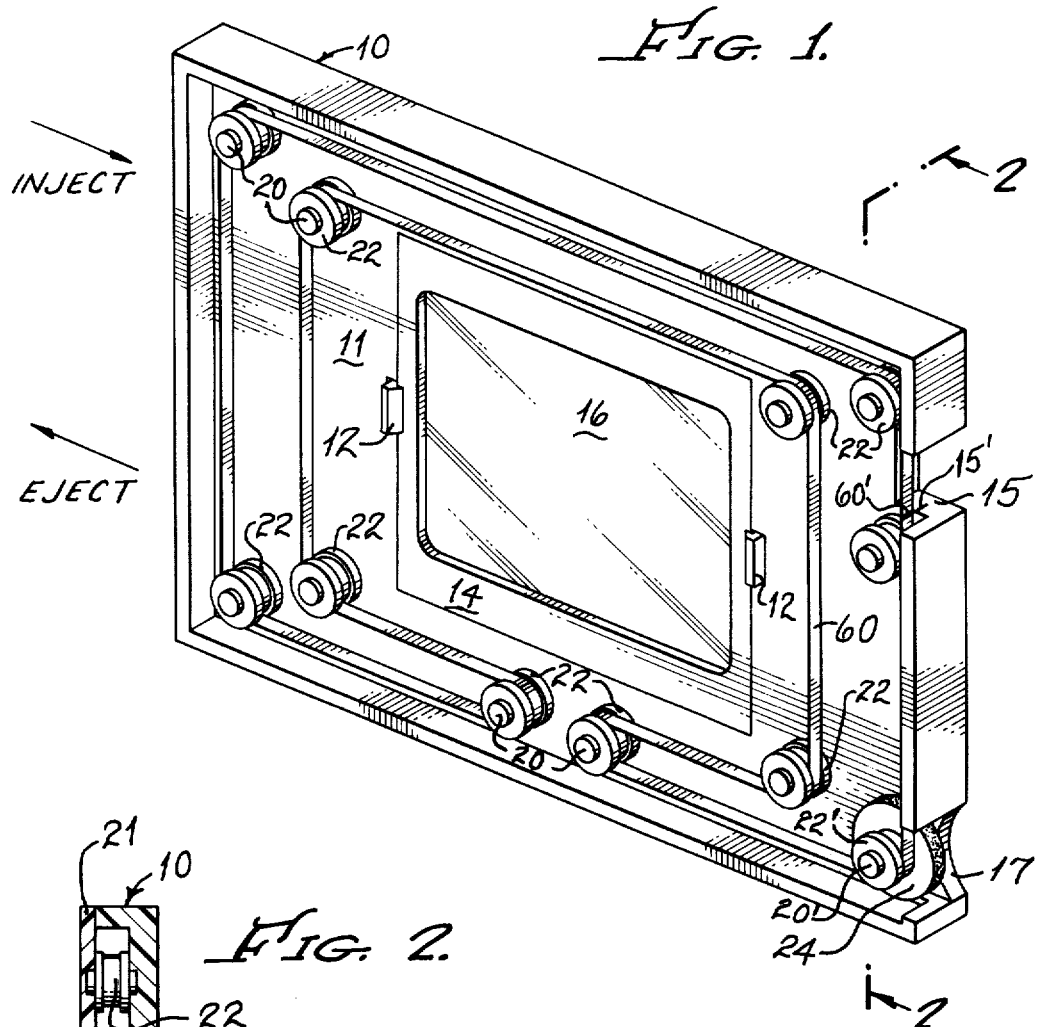
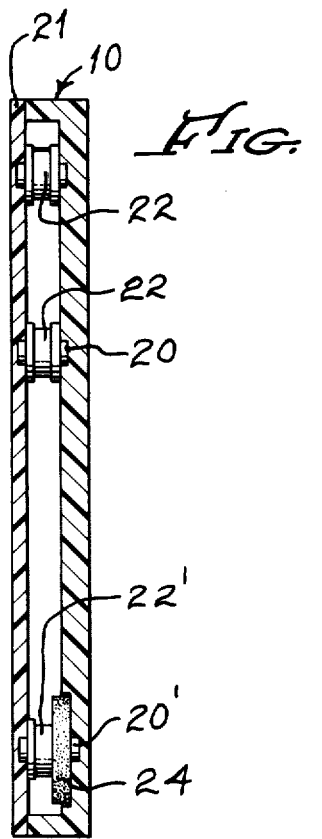
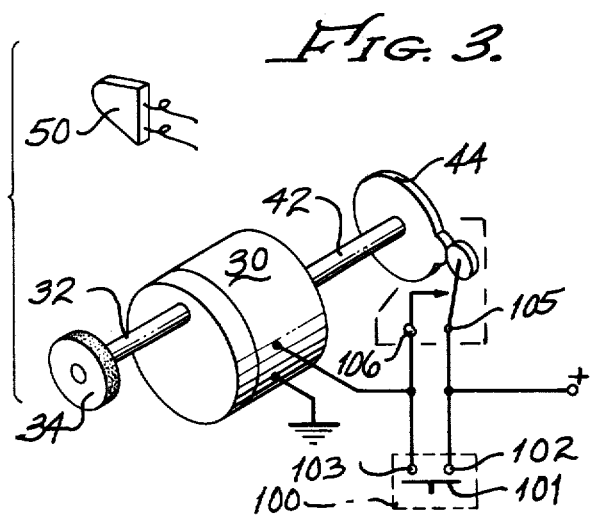

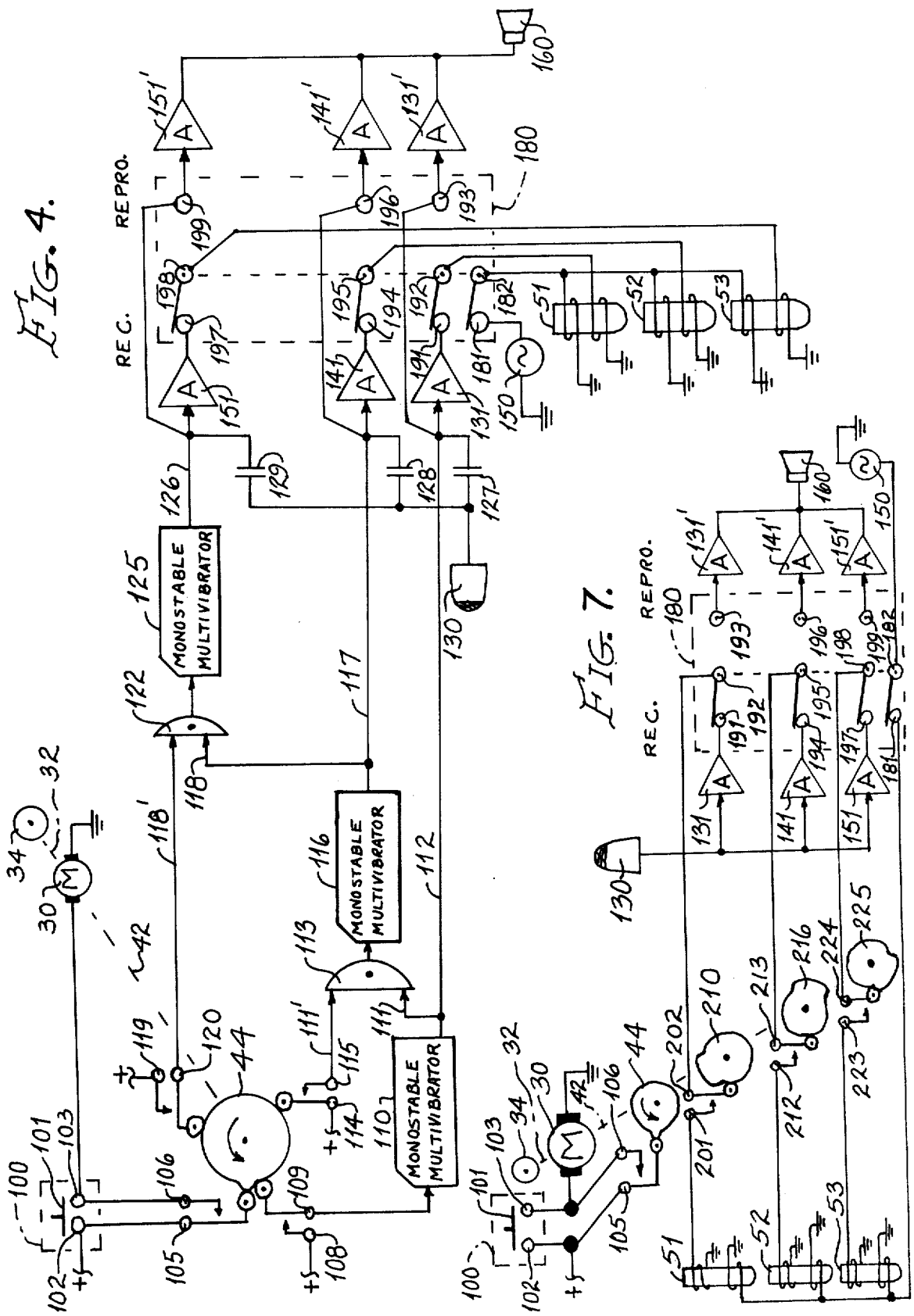

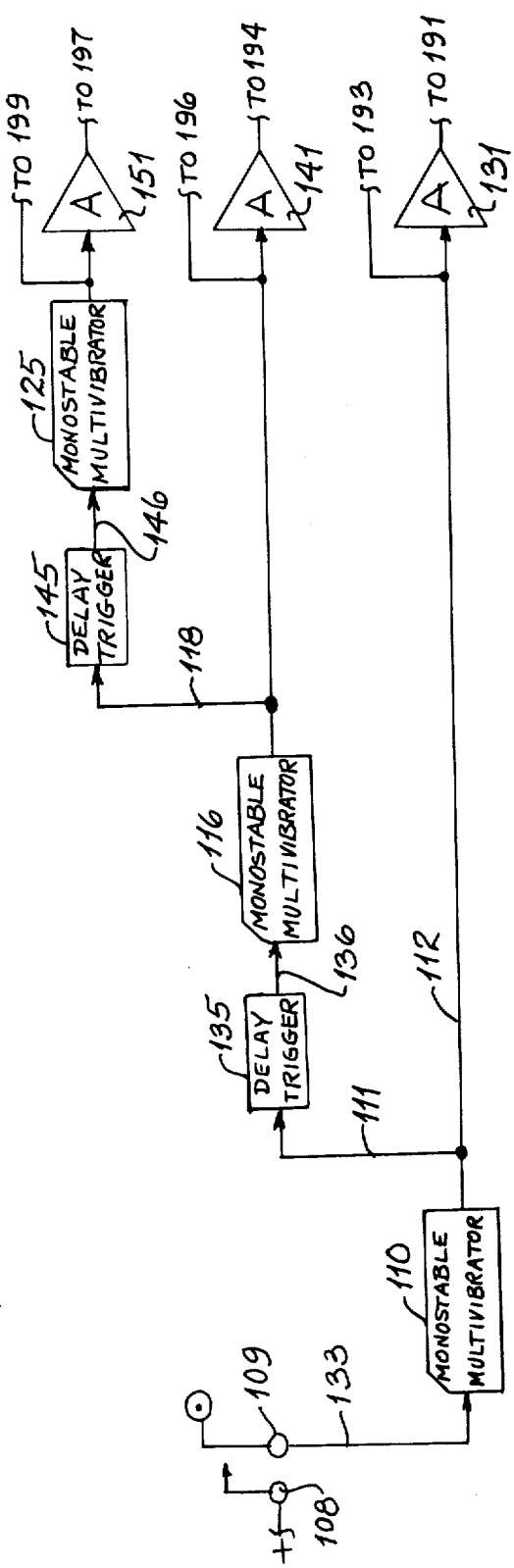
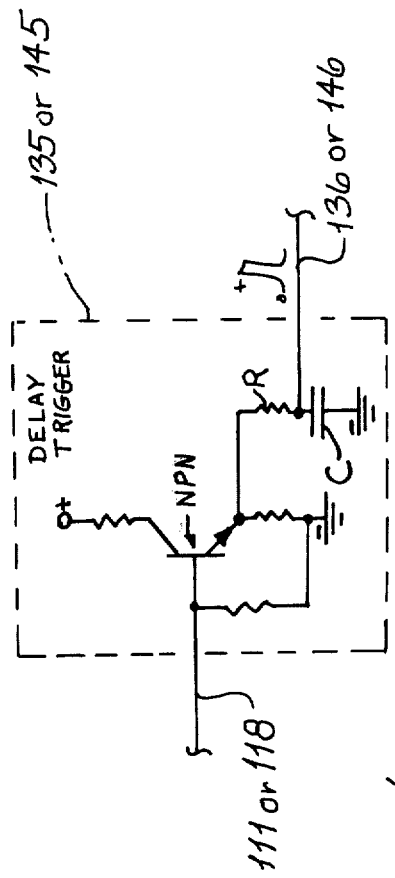
FIG. 5.
FIG. 6.

STILL IMAGE SLIDE WITH SOUND TRACK CONTROL

BACKGROUND OF THE INVENTION

This invention relates to the audio-visual field wherein sound is integrated with each still image to explain the contents of the image photographed or projected.

An objective of the invention is to provide transducer heads that need not be translated in order to record or reproduce sound.

Another objective is to provide more than one record or reproduce head associated with a driven record medium so that each head makes its own sound track independent of the tracks of other heads, but that the heads are sequentially switched after a predetermined period of operation of each head so that in effect the sound tracks made thereby are used in succession, consequently extending record or reproduce periods for each image photographed or displayed.

The prior art had the disadvantage of either having to transport or translate the head with respect to the record medium, or where the head is stationary, the amount of recording time practically possible without undue complexity of structure, is very limited.

SUMMARY OF THE INVENTION

A means which provides stationary images from slides and adds sound related to the images includes a retainer for inserting one of the slides, an endless taut magnetic tape mounted for translation within the confines of the retainer, and stationary magnetic transducer heads in cooperation with the tape during operative mode of the system. Control means connected to the magnetic heads provide a plurality of independent sound tracks for each of the stationary images, each of the sound tracks having a predetermined time duration. The heads are actuated by the control means for predetermined and sequential time periods. The control means can be electronic or electromechanical.

The electronic control means comprises a motor having a timing cam, digital circuitry connected to at least one switch of a plurality of switches cooperating with the timing cam, and a similar cam and switches are included in the electromechanical control system.

The electronic control means uses a plurality of monostable multivibrators and switches to initiate them in one version, but in a simplified version the use of some of these switches and associated gates are eliminated by utilizing a time delay trigger circuit feeding all but the first of the multivibrator.

Guide rollers adapted within the retainer guide, maintain the endless tape in taut condition. One of the guide rollers is integral with a driven wheel which cooperates with an impeller wheel of the motor for transporting the tape during operative mode of the means.

The retainer is provided with apertures for access in part of the impeller wheel and the heads into the retainer for cooperation of heads with the tape and for driving the driven wheel during the operative mode of the means.

BRIEF DESCRIPTION OF THE DRAWINGS

FIG. 1 is a perspective view, partially in cross-section, of a slide retainer frame having a translatable and driven recording belt integral therewith for cooperation with a plurality of stationary magnetic heads.

FIG. 2 is a cross-section view taken at plane 2—2 of FIG. 1.

FIG. 3 is a composite perspective view of a plurality of heads in one assembly, and a perspective view of a motor for driving the recording belt, a timing cam on the motor shaft, and circuitry to maintain motor in operation for a complete cycle.

FIG. 4 is a schematic view of an electronic control system for sequentially switching each of the heads after a predetermined time period of recording or reporducing sound by one head at a single time period, has elapsed.

FIG. 5 is a schematic view of the electronic control system of FIG. 4 but simplified by elimination of microswitches cooperating with a cam for timing and associated logic gates and substituting time delay trigger circuits.

FIG. 6 is a detailed schematic of the trigger circuits used in connection with FIG. 5 control system.

FIG. 7 is a schematic of an electromechanical control system for performing the same functions as performed by the control system of either FIG. 4 or FIG. 5.

DETAILED DESCRIPTION

Referring to FIG. 1, a slide and magnetic tape retainer is shown at 10. Such retainer is usually made of plastic material to effect economy, but may be made of any suitable material. This retainer is one that could be used in a still slide projector of the Kodak Carousel type or of the Sawyer projector type, but with sound added, or may be used as the sound recording or reproducing means shown in U.S. Pat. No. 3,526,454, or used in U.S. Pat. No. 3,592,535 in order to obtain multiple sound tracks without having to reposition such heads.

A conventional mounted slide is held by tabs 12, within recess 11 of retainer 10, attached to the body of the retainer. Such tabs hold a conventional mounted slide frame made of plastic, paper or metal as at 14 which retains slide or transparency 16.

An aperture 15 at one side of retainer 10 is provided for enabling a package of magnetic transducer heads to be partially injected therein for making cooperation with the surface of the taut magnetically coated recording tape.

An aperture 17, at the same side as aperture 15, is provided for enabling an impeller wheel to be partially inserted for making contact with and driving a driven member 24 which acts to translate tape 60 during opeative mode of the system.

Driven member 24 is mounted for rotation about pin 20' on such pin, which pin also has mounted thereon wheel or driven member 24. A pair of interface surfaces of member 24 and roller 22' are attached to each other so that when member 24 is driven, roller 22' will likewise be driven enabling tape 60 translation, which is also guided by roller 22' during each translation.

Pins 20 are secured at one end of each, in the major wall of retainer 10, as is pin 20', and are used to rotatably mount on each, a roller such as rollers at 22, which rollers are used to guide tape 60 and form a path circumjacent slide 16 so as to effect a maximum quantity of tape length corresponding to the particular dimensions of retainer 10. Tape 60 is taut within the confines of retainer 10 and within the confines of recess 11, and the tape path formation generally lies in a plane parallel to the plane of the slide.

Referring to FIG. 2, the cross-section view of retainer 10 shows how rollers 22 and 22' are mounted on pins 20 and 20' respectively, and also shows another view of driven wheel 24. It is also possible to have a cover 21 with a central aperture to enable the slide image to be projected through retainer 10, attached to retainer 10 by means of pins, screws or by snap members, none of which are shown.

Referring to FIG. 3, motor 30 with its internal speed reduction gear assembly, has an output shaft 32 to which impeller wheel 34 having coarse or roughened periphery is attached for cooperation with driven member 24, also having like roughened periphery. Another shaft 42 at opposite end of motor 30 is provided which has timing cam 44 mounted thereon. Cam 44, normally in its inoperative mode in the drawings, has its high protion in contact with a roller of contactor 105 of microswitch contactor pair 105-106. Contactor 106 in the inoperative mode does not cooperate with contactor 105. Contactor 105 is connected to a DC positive potential of a power source, not shown, and to contactor 102 of push button 100. Contactor 106 is connected to one side of motor 30 and to contactor 103 of push button 100. The return side of motor 30 is at ground or negative potential of the DC power source, shown by the conventional ground symbol. Push button 100 has a movable contactor 101, normally open with respect to contactors 102 and 103, so that when push button 100 is momentarily depressed, contactors 102 and 103 are closed and motor 30 is energized thereby causing rotation of cam 44 and impeller wheel 34.

The roller at end of contactor 105 comes rapidly in contact with the low portion of the cam, closing contactors 105 and 106 and thereby maintaining motor 30 energized, even after release of push button 100, until cam 44 has made a complete revolution, at which time motor 30 is automatically deenergized by the opening of contactors 105 and 106 due to cooperation of the roller at tip of contactactor 105 being again in cooperation with the high portion of cam 44. Details concerning the operation of motor 30 will be discussed in connection with the drawings concerning the control system.

When retainer 10 is in position in its projector, the roughened periphery of impeller wheel 34 will be in cooperation with the roughened periphery of driven member 24 to transport tape 60 during operative mode of the system.

When in such operative mode, the group of heads shown in composite form at 50 will be as to their record-reproduce surfaces in cooperation with the recording surface of tape 60, and will be partially within aperture 15 of retainer 10. It is of course appreciated that for one revolution of cam 44, impeller wheel 34 will make many revolutions to drive wheel 24. Upon completion of one revolution of cam 44, the speed or rotation of shaft bearing wheel 34 will be such so as to enable tape 60 to be driven three complete excursions or revolutions or three complete cycles, so that each of the three heads 51, 52 and 53 comprising composite head at 50, will enable to make and independent sound track completely the length of the tape thus resulting in three sound tracks on the tape to enable relating the information in sound as to the contents of the particular slide associated with the particular tape. Reproduction of the sound tracks from the tape is accomplished in a similar manner.

More details of head operation will be discussed in connection with FIGS. 4 through 7 below wherein the composite head at 50 will be referred to as individual heads 51, 52 and 53.

With reference to FIG. 1, for presetting tape 60 prior to recording or reproducing of sound, driven wheel 24 is rotated manually until a marking such as line 60' on tape 60 is in line with a marking or engraving 15' within aperture 15 of retainer 10. This will guarantee that reproduction action will not be started in the middle of a recorded message on the tape. Once set, the tautness of tape 60 should maintain this setting.

Referring to FIG. 4, head switching control system and the structural figures hereinabove described, are utilized in conjunction with a plurality of stationary magnetic transducer heads wherein each head produces an independent sound track in sequential order and the several sound tracks are reproduced in the same sequential order. Such method utilizes digital control electronics.

Push button 100 is provided with a movable contactor 101 for momentary cooperation with a pair of stationary contactors 102 and 103. Contactor 102 is at positive DC potential. Contactor 103 is electrically connected to DC motor 30 and the return side of motor 30 is connected to negative DC potential illustrated by the conventional ground symbol. Such ground symbol as used herein is also applicable to the AC signal return path.

Motor 30 has a shaft on one side thereof that drives an impelling wheel 34 which translates the tape or other recording medium as above described, and another shaft at other end of the motor, that has cam 44 mounted thereon and which cam 44 rotates one revolution for many revolutions of wheel 34. The shaft driving cam 44 drives it in direction indicated thereon.

A microswitch consisting of contactors 105 and 106 is provided for action in conjunction with cam 44. Contactor 105 has a roller attached at its end which cooperates with the high portion of cam 44 during the non-operative mode of the system. Contactor 105 is connected to contact 102 and is at positive DC potential. Contactor 106 is normally open with respect to contactor 105, in the non-operative mode, and is connected to contactor 103.

Upon momentarily depressing contactor 101 so it cooperates with contactors 102 and 103, power is applied to motor 30, starting shaft rotation of the motor and rotation of wheels 34 and cam 44. Contactors 105 and 106 will close, in view of the fact that the roller at end of contactor 105 is now positioned at the low portion of cam 44, and remain closed until a complete revolution of cam 44 occurs, at which time the high portion of cam 44 will again be in cooperation with the roller of contactor 105 to open contactors 105-106 and remove power from motor 30.

Contactor pair 108 and 109 comprises a microswitch positioned near the high portion of cam 44 where the roller at end of contactor 109 cooperates with the low portion of the cam. Upon start of rotation of cam 44, the high portion of cam 44 will cooperate with that roller and move contactor 109 so it cooperates with contactor 108 having DC power applied thereto. This will result in a start pulse being applied to input of monostable multivibrator 110 which is designed to act as a timing gate or electronic timer which starts the timing action upon the start pulse being applied to its input, to hold the timing gate open for a predetermined period of time. In this instance the nominal gate period is 10 seconds. Therefore, at output of multivibrator 110, a positive long pulse will appear, which pulse is used to overcome a negatively biased amplifier as at 131 or 131', which amplifiers use NPN junction transistors in their circuits. There amplifiers will thereby be caused to change from their cut-off states to their conductive states only during the period of the 10 second gate in view of the 10 second long positive going pulse output appearing at 112.

Monostable multivibrators of the type 110, 116 or 125 are known in the art and details thereof need not be discussed. An Ultra-Long Monostable Multivibrator is described at page 431 of the textbook entitled Sources of Electronic Circuits by Markus, copyright 1968 Mc Graw Hill Book Company, New York. This circuit is one discussed in greater detail by the authors, Schaeffert and Goldman in Electronic Equipment Engineering, Volume 12, Issue 12, December 1964, pages 57–58, published by Mactier Publishing Corporation, New York City. This circuit shows the input to the multivibrator with a positive going trigger pulse applied, and an output of a long positive going pulse. The parameters $R_3$ and $C_1$ of the improved circuit therein determines the pulse period of the long output pulse. If $R_3$ were set to 500,000 ohms and $C_1$ to 20 microfarads, the required 10 second pulse width output is obtained. The unimproved circuit, also shown in this article, provides a separate output trigger pulse which may be used as an input to start multivibrator 116, and similarly trigger output of 116 may be used to start multivibrator 125, if such unimproved circuit is used instead of the improved circuit, which would avoid using microswitches 114–115 and 119–120. In such instance, two outputs would be shown as outputs from each of the multivibrators. For example, for multivibrator 110, the long 10 second positive going pulse would appear at line 112 and the short trigger pulse at the output would be present as a separate output. Hence in this case, wires 111 and 112 would be severed, and wire 111 would have a separate output trigger pulse to feed monopulse multivibrator 116 input directly or through gate 113 in conjunction with a pulse provided at 111'. In the instance of utilizing the output trigger pulse of about 5 millisecond width to trigger multivibrator 116, both contactor pair 114–115 and gate 113 can be eliminated. Similar modifications to the circuit can be made with respect multivibrator 125, gate 122 and contactors 119–120.

The other Long-Pulse Monostable circuit is shown at page 432 of the same textbook by Markus, here with an input trigger and a long pulse output without additional option of the trigger pulse output. This circuit needs some timing capacitor adjustment to decrease the time of the timing gate from 11 to 10 seconds, but otherwise its connection would be as shown in FIG. 4.

The momentarily closed contactor pair 108–109 will initiate the required start pulse for multivibrator 116 and thereby provide the long output positive going pulse at 111 and 112 for the first 10-second timing period.

Amplifier 131 input is connected to wire 112 so that during the 10 seconds when multivibrator 116 produces its positive going pulse output, amplifier 131 will be biased so that it passes intellignece applied to microphone 130 through capacitor 127 and into the input of amplifier 131.

The output of amplifier 131 is connected to stationary contactor 191 of record-reproduce switch 180. Contactor 192, during the record mode, in cooperation with contactor 191, will enable intelligence or sound imposed upon microphone 130 to be passed through capacitor 127, through amplifier 131 and into the intelligence coil of head 51.

During recording mode, oscillator 150 having a frequency of about 60 kilohertz will provide the requisite AC bias or recording carrier since such oscillator is connected to contactor 181, and during recording mode contactor 182 which is in cooperation with contactor 181 is also connected to the bias or carrier coils of each of heads 51, 52 and 53.

Microphone 130 is also connected through similar capacitors 128 and 129 to inputs of amplifiers 141 and 151 respectively.

When cam 44 rotates about 120°, the high portion of cam 44 cooperates with the roller at tip of microswitch contactor 114 of contactor pair 114–115. Contactor 114 is at positive DC potential, so that upon momentary cooperation of contactors 114 and 115, a pulse will be applied to contactor 115 providing a pulse input 111' to AND gate 113. Pulses at 111 and 111' will provide a pulse at output of gate 113 and hence an input to multivibrator 116 to start this multivibrator in producing its 10-second positive going pulse timing gate output just when the prior multivibrator finished producing its timing gate.

In actuality, the AND gates 113 and 122 could be eliminated since microswitches 114–115 and 119–120 are used and can connect such microswitches directly to the multivibrator inputs to provide the start pulse inputs. But the use of AND gates which are pulse dependent assures that there will be no channel or amplifier operation overlap and that the various multivibrators will start at proper times in relation to completion of prior multivibrator action.

Hence monostable multivibrator 116 will have been triggered on at same time as multivibrator 110 ceases to produce its long pulse output, and consequently a 10-second positive pulse output is provided at 117 and 118. As heretofore described for amplifier 131, amplifier 141 will be conductive during the second 10-second period only, with amplifier 131 and amplifier 151 being cut off. The output of amplifier 141 being connected to contact 194 of switch 180, and contactor 195 being in cooperation with contact 194, signal path connecting the intelligence coil of head 52 will be provided. Recording will then be possible during the second 10-second period due to operation of multivibrator 116.

When cam 44 has moved the second 120° in rotation, the high portion of cam 44 will be in position to cooperate with the roller at the tip of contactor 120, so that contactor 120 cooperates with contactor 119 that has a DC positive potential thereat, thereby creating a pulse at line 118'. The pulses at 118 and 118' will provide the requisite AND logic of unity to AND gate 122 input so that the output of gate 122 will provide a pulse to start monostable multivibrator 125. Once started, as in the foregoing cases, multivibrator 125 will provide its output of a 10 second positive going pulse at 126 as an input to the base of the NPN transistor constituting the normally negatively biased cut off condition of amplifier 151, and hence the positive pulse at 126 will overcome the negative bias and cause amplifier 151 to conduct, so that signals applied through microphone 130 and capacitor 129 will be amplified by amplifier 151. The amplified output of amplifier 151 is connected to contactor 197 of switch 180, and contactor 198 being in cooperation with contactor 197 during the record mode, will provide a connection to the intelligence coil of head 53.

At end of the last 10-second period, the high portion of cam 44 will again be in cooperation with the roller of contactor 105 to open contactors 105–106 and shut off motor 30, cam 44 having completed its third 120° segment of rotation.

Wires are utilized to connect the inputs of the recording amplifiers to the inputs of the reproducing amplifiers, so that the control ciruit for each of the three 10-second periods used for recording are also used for reproducing the recorded sound, using the same heads 51, 52 and 53.

Accordingly, in the reproduce mode, contactor 192 will cooperate with contactor 193, contactor 195 will cooperate with contactor 196, and contactor 198 will cooperate with contactor 199, to connect the intelligence coils of heads 51, 52 and 53 to inputs of amplifiers 131', 141' and 151' respectively. Contactors 181 and 182 will be open since the switch blades 182, 192, 195 and 198 will be in the reproduce position, therefore removing the AC bias or modulation signal from all the heads, not used for reproduction purposes.

In similar sequence of operation of multivibrators 110, 116 and 125 with their corresponding reproduce amplifiers 131', 141' and 151', all the outputs thereof connected to loudspeaker 160, the sound tracks imposed upon the recording medium will be reproduced in the same manner due to programmed track switching as described in connection with the recording mode.

Though, three 10-second record or reproduce periods were shown utilizing three heads, it is obvious from the above that any number greater or less than three heads can be used when providing an equal number of switching channels, thereby enabling the use of non-translatable or non-scan type heads.

Referring to FIGS. 5 and 6, it should therefore be obvious from the partial electronic system schematic that FIG. 4 can be substantially simplified. Microswitch 114–115 can be eliminated by providing a delay trigger pulse circuit 135 where its input is connected to wire 111 and its output at 136 is connected as an input to multivibrator 116. Also microswitch 119–120 can be eliminated by connecting wire 118 to input of delay trigger pulse circuit 145 the output 146 of which can be connected directly to the input of multivibrator 125. In FIG. 5., the partial electronic circuit of the control system is shown as having its initial trigger pulse initiating the multivibrator at 110 being connected to contactor 109 of microswitch 108–109, the same as in FIG. 4. It should be understood that the components shown in FIG. 4 numbered 100, 44, 30, 34, 180, 131, ' 141', 151', 160, 130, 127, 128, 129, 150, 51, 52, 53 and interconnecting wires between them which are not shown in FIGS. 5 and 6, are otherwise identical with FIG. 4 in these respects.

With particular reference to FIG. 6, NPN transistor with common emitter is used for the delay trigger pulse circuits 135 or 145. When input to base 111 or 118 representing the long 10 second pulse thereat is applied, the normally negatively biased base potential is raised to a positive potential by virture of the positive going 10 second pulse to cause base current to flow and hence for the transistor to conduct. Current will therefore flow during the 10 second period through the resistor in series with the emitter and apply a positive voltage across R-C combination. The values of R and C are selected so that between the junction of R and C and ground capacitor C will have a positive going short pulse, in the order of 5 to 10 milliseconds wide at output terminal 136 or 146 to act as a trigger for the multivibrator being started. The short pulse width is obtained at 136 or 146 by virtue of the integration circuit comprising R and C. The voltage level of that pulse is of such magnitude sufficient to trigger the multivibrator in question.

A similar circuit to that shown in FIG. 6, except with R-C network eliminated, and its output being between the emitter and ground, is used for amplifiers 131, 131', 141, 141', 151 and 151'.

Referring to FIG. 7, an electromechanical version of the electronic control system may also be used for multiple sound track production with stationary heads.

In this control system the heads at 51, 52 and 53 are connected to switch 180 in identical manner as in the electronic system. The record amplifiers 131, 141 and 151 are connected to switch 180 as in the electronic system. Microphone 130 may be connected directly to amplifiers 131, 141 and 151 if the bias voltage at the base of the NPN transistor comprising the amplifier is low, otherwise to avoid damaging the microphone, capacitors may be connected in series with each amplifier input as in the electronic system. The oscillator 150 is the same and is similarly connected through switch 180 to bias the heads during record mode. In the reproduce mode the reproduce amplifiers 131', 141' and 151' are connected to switch 180 as in the electronic system and all outputs from these amplifiers are connected to loudspeaker 160. The jumper wires conecting inputs of amplifiers 131 and 131', 141 and 141' and 151 and 151' are not required here since intelligence coil of each head is separately connected through a microswitch which is in the closed contact position only during its duty cycle, either when recording or reproducing sound.

Consequently, the intelligence coil of head 51 is connected to contactor 201 of microswitch 201–202, and contactor 202 is connected to movable contactor 192 of switch 180. The intelligence coil of head 52 is connected to contactor 212 of microswitch 212–213 and contactor 213 is connected to movable contactor 195 of switch 180. Th intelligence coil of head 53 is connected to contactor 223 of microswitch 223–224 and contactor 224 is connected to movable contactor 198 of switch 180. In this way the heads may all be switched by manual operation of switch 180 from the record to the reproduce mode or vice-versa.

Push button 100, microswitch 105–106, motor 30, wheel 34 and cam 44 are identically structured and connected as in the electronic control system. Here however additional three cams 210, 216 and 225 with raised portions extending about 120° each at cam peripheries are needed; such cams being mounted on the same shaft as cam 44. These additional cams will in conjunction with microswitches 201–202, 212–213 and 223–224 respectively substitute in the mechanical sense for the structure utilized in the electronic system to provide similar functions.

Hence, the cams and the associated microswitches are spaced 120° in angular rotation from each other, so that the when motor 30 is energized as in the electronic system and cam 44 begins to be rotated, cam 210 will close microswitch contactors 201-202 for the first 10 seconds, the roller of contactor 202 riding on the high portion of cam 201 for 10 seconds will cooperate during such period with the high period of cam 210. This will permit recording by head 51, or reproducing sound when in the reproduce mode by such head. At the end of the first 10 seconds, contacts 201-202 will open and cam 216 will be in position so its high portion is in cooperation with contactor 213 of microswitch 212-213 for the next 10-second period. At the end of such middle 10-second period, cam 225 will be in position to have its high portion cooperate with contactor 224 of microswitch 223-224 for the final 10 second period of operation, at the end of which time the cams will be back in their start position, including cam 44 which will shut off motor 30 automatically as in the case of the electronic system.

I claim:

1. In a means for providing stationary images from slides and sound related to said images, the combination comprising:
   a retainer for one of the slides;
   an endless taut magnetic tape mounted for translation within the confines of the retainer circumjacent said one of the slides;
   stationary magnetic transducer heads, in cooperation with the tape, communicating non-digital signal information therebetween during operative mode of said means; and
   control means connected to the magnetic heads for providing a plural number of individual sound tracks, one of said sound tracks per head in predetermined sequence for each of the stationary images, said control means including first means for enabling each of the sound tracks to have a predetermined time duration and second means for activating each of said heads for a period substantially equal to said predetermined time duration, said first and second means enabling the non-digital signal information to be continued from one of said sound tracks to another.

2. The invention as stated in claim 1, wherein said control means is electronic.

3. The invention as stated in claim 2, wherein the electronic control means comprises a plurality of monostable multivibrators serially electrically interconnected.

4. The invention as stated in claim 3, including a trigger circuit connected between the output of one said multivibrator and the input of another one of the multivibrators.

5. The invention as stated in claim 2, wherein said electronic control means comprises:
   a motor having a timing cam integral therewith;
   a plurality of switches in cooperation with the cam; and
   digital circuitry connected to at least one of the switches.

6. The invention as stated in claim 1, wherein said control means is electromechanical.

7. The invention as stated in claim 6, wherein said electromechanical control means comprises:
   a motor having a timing cam;
   a plurality of cams driven by said motor during operative mode of said control means; and
   a plurality of switches in cooperation with the plurality of cams, one of the plurality of switches for each corresponding one of the plurality of cams.

8. The invention as stated in claim 1, including guide rollers adapted to said retainer, said guide rollers being in cooperation with said tape.

9. The invention as stated in claim 8, including a driven member, said driven member being integral with one of said guide rollers.

10. The invention as stated in claim 9, including a motor having an impeller wheel, said impeller wheel being in cooperation with the driven member during operative mode of said means.

11. The invention as stated in claim 10, wherein the retainer has access apertures for admitting in part said impeller wheel, and for admitting in part said heads for cooperation with a surface of said tape.

* * * * *